US006119825A

United States Patent [19]
Nisley

[11] Patent Number: 6,119,825
[45] Date of Patent: Sep. 19, 2000

[54] MOTOR BRAKE HAVING IMPROVED TORQUE ADJUSTMENT MECHANISM

[75] Inventor: Donald L. Nisley, Greenville, S.C.

[73] Assignee: Reliance Electric Technologies, LLC, Thousand Oaks, Calif.

[21] Appl. No.: 09/137,588

[22] Filed: Aug. 21, 1998

[51] Int. Cl.[7] .................................................. B60T 13/04
[52] U.S. Cl. ...................... 188/171; 188/161; 188/163; 188/216; 267/177
[58] Field of Search .................... 188/171, 72.3, 188/161, 163, 216, 72.8, 72.7, 71.8, 71.9, 196 V, 196 M; 267/177, 175, 170, 286; 310/75 R, 93, 77; 92/63, 130 R, 130 A; 74/89.15, 592; 29/509, 520, 898.07, 402.02, 523, 525.02; 303/9.76; 192/90; 411/353, 999, 431, 427

[56] References Cited

U.S. PATENT DOCUMENTS

| | | | |
|---|---|---|---|
| 2,747,698 | 5/1956 | Currie | 188/171 |
| 2,983,339 | 5/1961 | Neff | 188/171 |
| 3,608,679 | 9/1971 | Harrison | 188/171 |
| 3,765,465 | 10/1973 | Gulistan . | |
| 4,020,926 | 5/1977 | Slatter et al. | 188/171 |
| 4,116,308 | 9/1978 | Sever | 188/171 |
| 4,138,001 | 2/1979 | Lee et al. | 188/170 |
| 4,802,700 | 2/1989 | Stevenson et al. | 411/326 |
| 4,993,756 | 2/1991 | Bechu . | |
| 5,073,070 | 12/1991 | Chang . | |
| 5,207,462 | 5/1993 | Bartholomew . | |
| 5,492,417 | 2/1996 | Baker et al. . | |
| 5,685,398 | 11/1997 | Marshall et al. | 188/171 |
| 5,685,650 | 11/1997 | Martinie et al. . | |
| 5,749,690 | 5/1998 | Kutz . | |
| 5,897,146 | 4/1999 | Saito et al. . | |

OTHER PUBLICATIONS

A prior art document identified as Lenze Power Transmission Operation, Instruction, & Parts Manual, entitled "Electromagnetic Spring–Loaded Brake Type 14.448".

*Primary Examiner*—Douglas C. Butler
*Attorney, Agent, or Firm*—Craig N. Killen; John J. Horn; William R. Walbrun

[57] ABSTRACT

A motor brake apparatus includes an improved torque adjustment mechanism. The adjustment mechanism includes an adjusting nut having a outer ring groove aligned with an inner ring groove defined in a receiving bore of the brake housing structure. A snap ring is located in the aligned grooves to connect the housing structure and adjusting ring while allowing free rotation therebetween. Inner threads of the adjusting nut engage outer threads of a spring pushing element such that rotation of the adjusting nut causes axial movement of the pushing element. The pushing element engages one or more springs which are thereby compressed or released, depending on which axial direction the pushing element is moved. The spring force varied in this manner results in varying levels of braking torque.

21 Claims, 6 Drawing Sheets

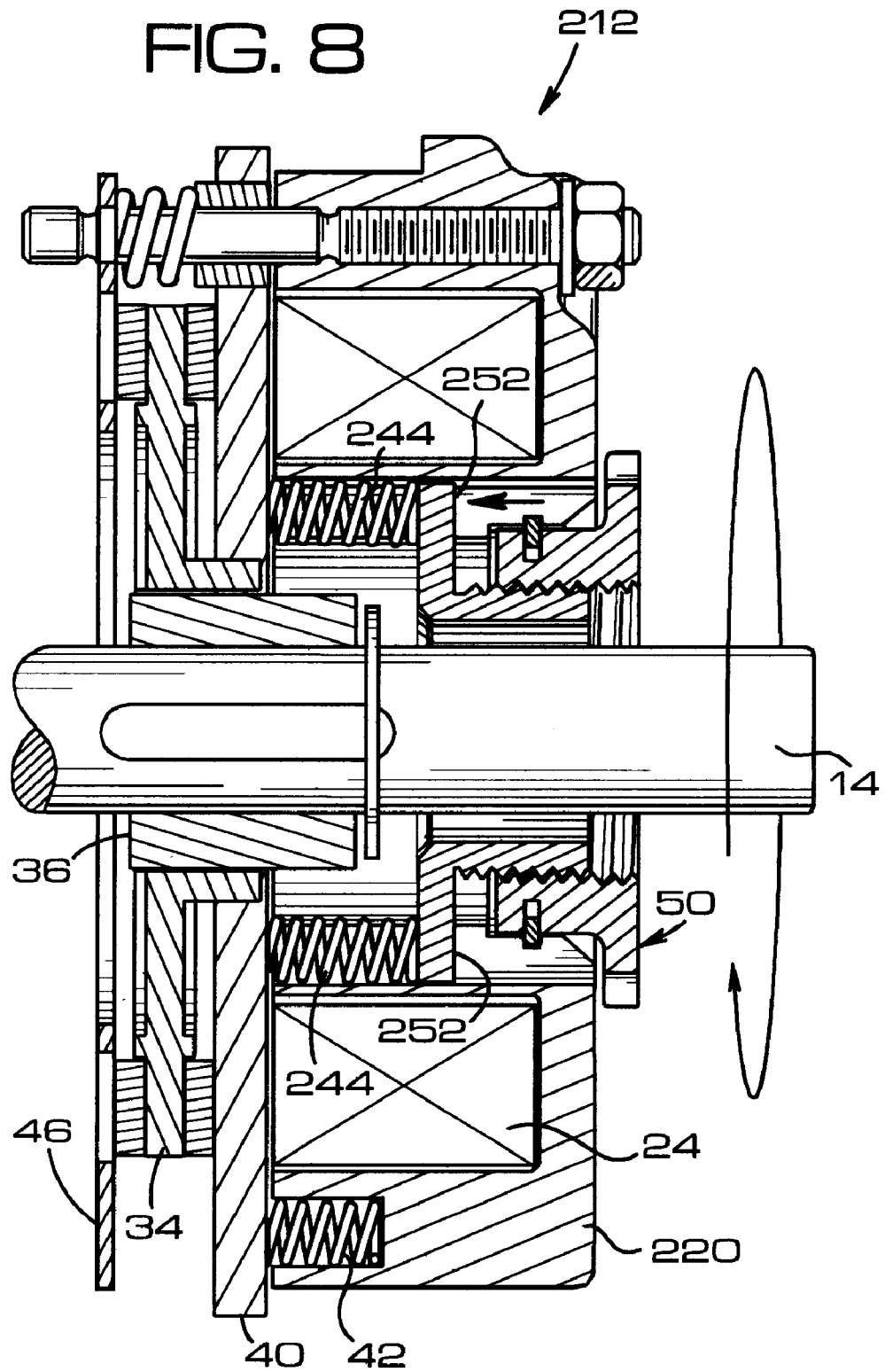

MOTOR BRAKE HAVING IMPROVED TORQUE ADJUSTMENT MECHANISM

BACKGROUND OF THE INVENTION

The present invention relates generally to braking devices of the type used in conjunction with an electric motor. More particularly, the invention relates to such a braking device including an improved torque adjusting mechanism.

Braking devices are often used in conjunction with electric motors to arrest shaft rotation when the motor is deactivated. Often, these braking devices are configured as electromagnetic release, spring set units. In such an arrangement, spring force is applied against an armature (or "clapper") plate that engages friction material attached to a friction disk. The friction disk rotates with the motor shaft, and is connected thereto using a splined hub and key assembly. When the power is turned off, the spring force pushes the armature plate into engagement with the friction disk. Because the armature plate is stationary in the rotational direction, a resisting torque or force is imposed on the friction disk to cause the motor shaft to stop.

The amount of spring force on the armature plate can determine the period of time required to stop the load being driven by the motor. To permit control of the rate of braking, braking devices of this type are often provided with torque adjusting mechanisms. Many current designs use adjustable compression springs or a single compression spring in the inner diameter of the brake housing structure. To provide adjustment, the housing structure defines inner threads engaged by an adjusting nut. As the adjusting nut is threaded into and out of the housing, the spring is compressed or released through axial spacing change. The change in axial spacing will increase or decrease the spring force.

One disadvantage of this design is the axial spacing required to allow for the threading action of the adjusting nut. Because axial space is at a premium in many applications, a saving of even a small axial space would often be desirable.

SUMMARY OF THE INVENTION

The present invention recognizes and addresses the foregoing disadvantages, and others, of prior art constructions and methods. Accordingly, it is an object of the present invention to provide a novel torque adjustment mechanism for a motor brake device.

It is a further object of the present invention to provide a torque adjustment mechanism which does not vary the overall axial space taken up by the brake housing.

It is a still further object of the present invention to provide a torque adjustment mechanism that can be easily retrofit onto a suitable brake housing.

It is an additional object of the present invention to provide a novel housing structure for a motor brake device.

Some of these objects are achieved by a braking apparatus for use with a rotatable shaft. The braking apparatus comprises a frictional disk connected to the shaft and rotatable therewith. An armature plate is axially moveable into and out of engagement with the frictional disk. Axial movement of the armature plate in a first axial direction is effected by an electromagnetic coil assembly. At least one spring element applies an axial spring force to the armature plate in a second axial direction opposite to the first axial direction.

The braking apparatus further includes an adjusting mechanism engaging the spring element to permit adjustment of the spring force upon rotation of a rotatable adjusting element. The rotatable adjusting element is substantially stationary in the axial direction during rotation thereof with respect to a housing structure of the braking apparatus.

In exemplary embodiments, the adjusting mechanism includes an annular ring, such as a compressible snap ring, interconnecting the adjusting element and the housing structure to permit relative rotation therebetween. Preferably, the annular ring is received in both a first annular ring groove defined in the housing structure and a second annular ring groove defined in the adjusting element. Often, the housing structure of the braking apparatus may have a tapered lead-in surface to cause radial compression of the snap ring during installation of the adjusting element.

The adjusting mechanism may be equipped with a pushing element having a first threaded portion engaging a second threaded portion of the adjusting element. As a result, rotation of the adjusting element will cause axial movement of the pushing element. The pushing element, in turn, engages the spring element to vary a spring force thereof. The pushing element may further comprise one or more radial tabs received in respective key slots defined in the housing structure.

In some embodiments, the spring element may comprise a helical spring surrounding the shaft. Other embodiments include a plurality of spring elements angularly spaced apart at respective locations around the shaft. Where multiple springs of this latter type are provided, the pushing element may include multiple radial tabs, each engaging a respective spring element.

Other objects of the invention are achieved by a variable spring force actuation mechanism comprising a housing structure defining a receiving bore therein. A rotatable adjusting nut having inner threads thereon extends into the receiving bore. The adjusting nut is substantially stationary in the axial direction during rotation thereof with respect to the housing structure. A pushing element located in the receiving bore has outer threads engaging the inner threads of the adjusting nut. Rotation of the adjusting nut will cause axial movement of the pushing element. At least one spring element is engaged by the pushing element such that axial movement of the pushing element will cause a variation in the spring force thereof.

Still further objects of the present invention are achieved by a housing structure for a motor brake apparatus. The housing structure defines an axial receiving bore. A tapered lead-in surface integrally extends into the axial receiving bore to facilitate radial compression of a compressible snap ring during installation thereof. An annular snap ring groove, axially spaced from the tapered lead-in surface by a snap ring compression portion, extends about an inner surface of the receiving bore. Furthermore, at least one key slot extends axially along the inner surface of the receiving bore.

Additional objects of the present invention are achieved by a method of installing a torque adjustment nut into an axial receiving bore of a motor brake housing. One step of the method involves providing the adjustment nut to have an extension portion defining a first annular snap ring groove on an outer surface thereof and inner threads on an inner surface thereof. A spring pushing element is also provided, having outer threads thereon for engaging the inner threads of the adjustment nut. The motor brake housing is provided to define a tapered lead-in surface extending into the axial receiving bore. The motor brake housing further defines a second annular snap ring groove extending about an inner surface of the receiving bore at a location axially spaced from the tapered lead-in surface by a snap ring compression portion.

Further aspects of the method involve inserting a compressible snap ring into the first annular snap ring groove of the adjustment nut. The adjustment nut is moved into the receiving bore such that the tapered lead-in surface will cause the snap ring to be compressed in the first annular snap ring groove. The adjustment nut is further moved into the receiving bore until the first annular snap ring groove and the second annular snap ring groove are aligned. When the grooves are so aligned, the snap ring will expand to interconnect the adjustment nut and the motor brake housing while permitting relative rotation therebetween.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which:

FIG. 8 is a cross-sectional view of a shaft braking apparatus of the present invention having a torque adjustment mechanism in a second embodiment, in which multiple springs are spaced apart at a plurality of locations about the shaft;

Figure 1:
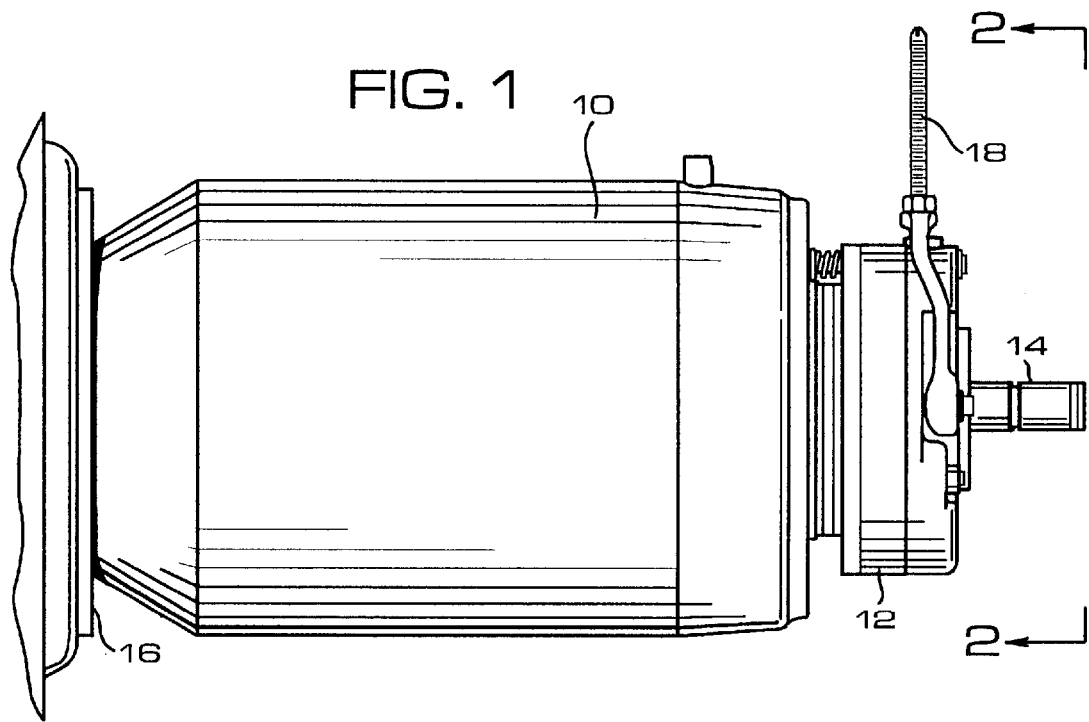
FIG. 1 is an elevational view of an electric motor having a shaft braking apparatus attached thereto.
Figure 2:
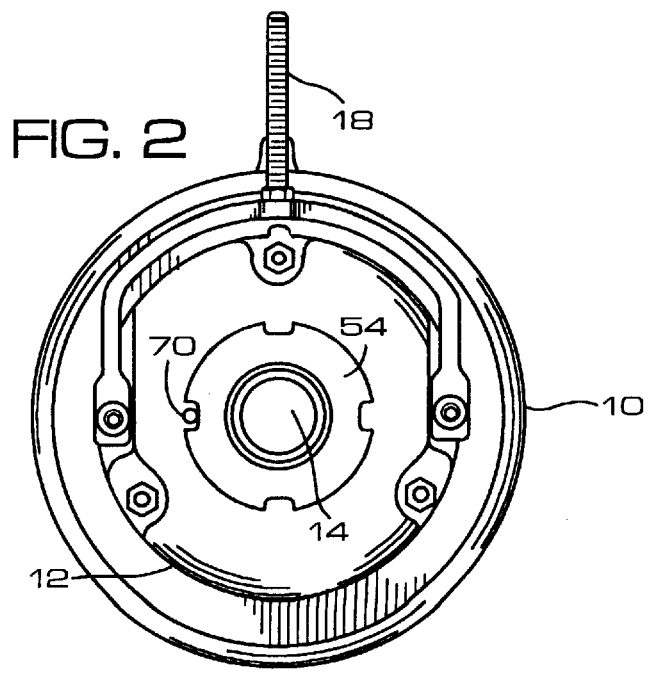
FIG. 2 is an end view taken along line 2—2 of FIG. 1.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting the broader aspects of the present invention, which broader aspects are embodied in the exemplary constructions.

FIG. 1 illustrates an electric motor 10 having a brake apparatus 12 constructed in accordance with the present invention. Motor 10 includes a shaft 14, one end of which is connected to internal gears of a speed reducer unit (part of which can be seen at 16) in this typical application. The load to be driven is, in turn, connected to the output shaft of the speed reducer. As shown, the opposite end of shaft 14 extends axially through brake apparatus 12. In fact, shaft 14 may extend a short distance beyond brake apparatus 12 for attachment of accessory items such as a fan or a speed encoder.

In the illustrated embodiment, brake apparatus 12 is constructed as an electromagnetic release, spring set unit. During operation of motor 10, brake apparatus 12 is released by electromagnetic action to allow free rotation of shaft 14. When coil power is turned off, the brake is set under spring force. Application of the brake resists rotation of shaft 14, causing the load to slow until stopped. Like many motor brakes of the prior art, brake apparatus 12 may also have a suitable release mechanism to allow manual release of the braking force. A handle 18 is provided to actuate the manual release feature.

Figure 3:
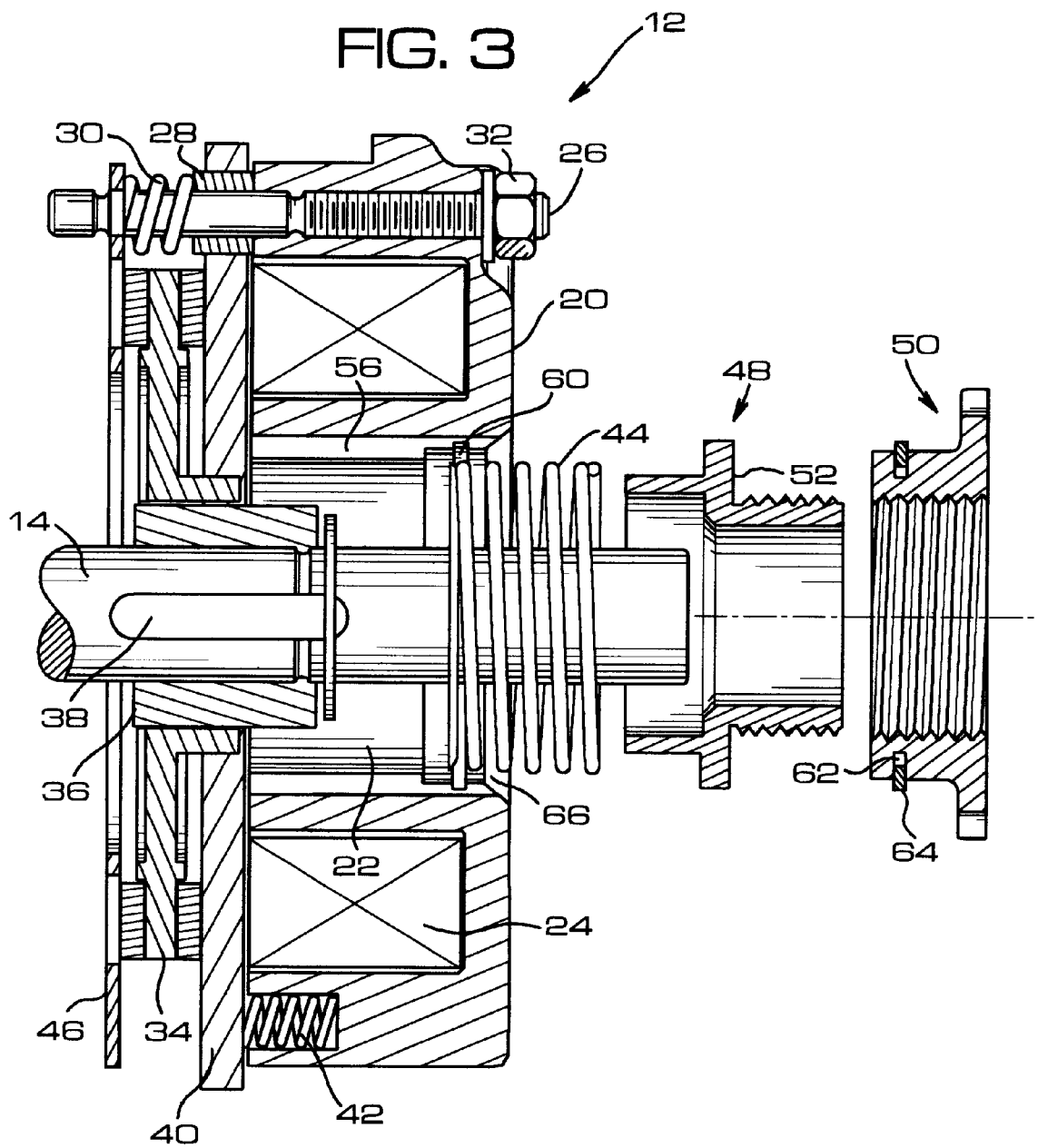
FIG. 3 is a cross-sectional view of the shaft braking apparatus of FIG. 1 having a torque adjustment mechanism in one embodiment, with some parts being removed for purposes of illustration.
Figure 4:
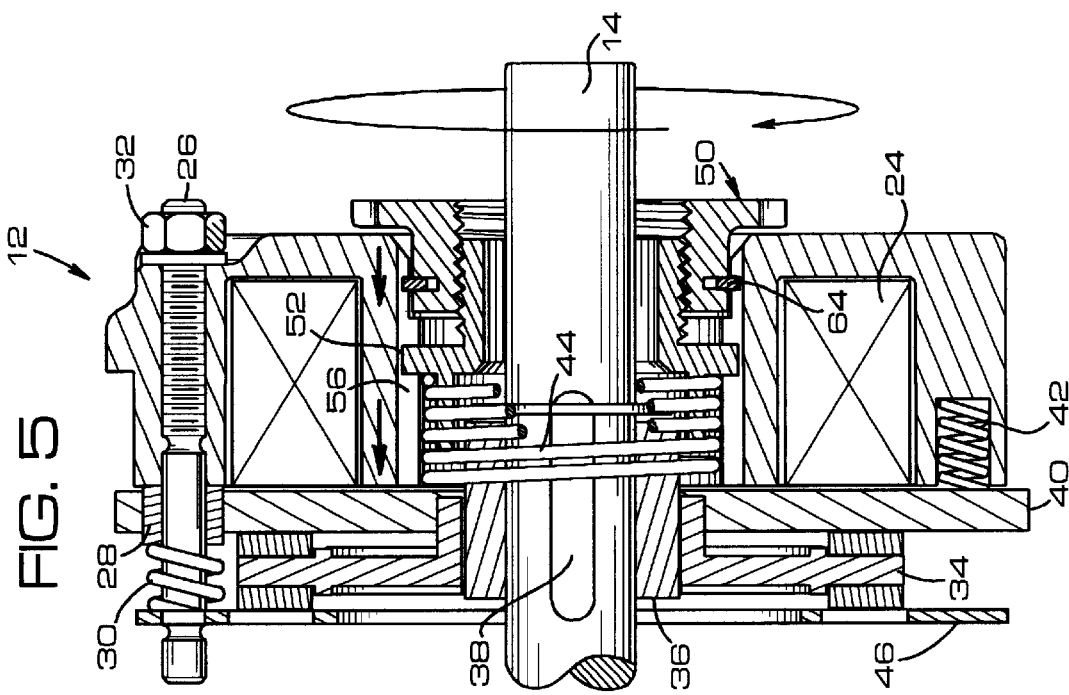
FIG. 4 is a view similar to FIG. 3 with all components installed for use.
Figure 5:
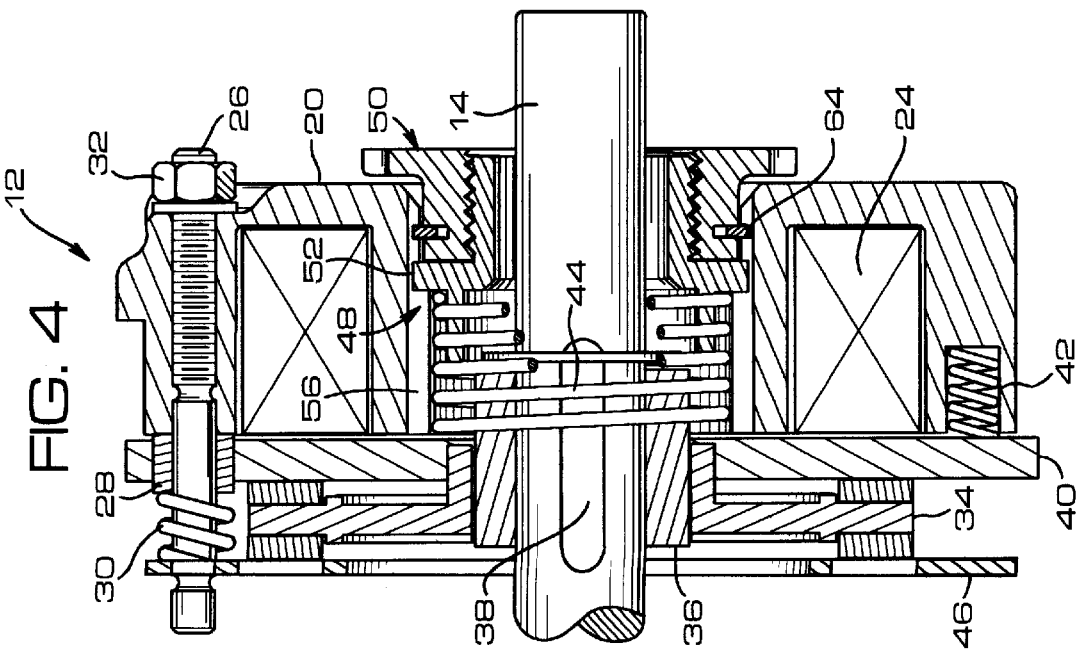
FIG. 5 is a view similar to FIG. 4 further illustrating use of the torque adjustment mechanism.

Referring now to FIGS. 3 through 5, the internal construction of brake apparatus 12 can be easily explained. As can be seen, apparatus 12 includes a housing structure 20 defining a relatively large receiving bore 22 through which motor shaft 14 extends. The electromagnetic release function is provided by an actuation coil, schematically indicated at 24, contained within housing structure 20. A plurality of mounting posts, such as post 26, are threaded or press fit, as appropriate, into the housing of electric motor 10 to attach brake apparatus 12 thereto. The mounting posts may be equipped with suitable means, such as bushing 28 and spring 30, to permit adjustment of the brake air gap through tightening of an associated bolt or the like, such as bolt 32.

Brake apparatus 12 includes a friction disk 34 defining a splined bore therethrough. A splined hub 36, keyed to shaft 14 at keyway 38, is received in the splined bore of friction disk 34 as shown. As a result, friction disk 34 will rotate with motor shaft 14. In the illustrated embodiment, however, slight axial movement of friction disk 34 is permitted to facilitate the braking function as will be described.

Brake apparatus 12 further includes an armature plate 40 that remains stationary with respect to housing structure 20 in the rotational direction. Armature plate 40 moves axially, however, into and out of engagement with friction disk 34. Movement in a first axial direction, away from friction disk 34, is effected by actuation of coil 24. Springs, such as springs 42 and 44, serve to move armature plate 40 in a second axial direction opposite to the first axial direction. A stationary friction plate 46 may be located behind friction disk 34 as shown.

When the brake is released, such as during motor operation, armature plate 40 will be retracted against housing 20. If power to coil 24 is interrupted, spring force will then cause axial movement of armature plate 40 in the direction of friction disk 34. As shown in FIG. 5, this movement of armature plate 40 will sandwich friction disk 34 between it and friction plate 46. A torque to resist rotation of shaft 14 is thereby created, as desired.

As described above, the time required to stop a particular load is directly related to the braking torque. The braking torque, in turn, is a function of the spring force imposed on armature plate 40. Thus, to permit adjustment of the braking torque, the present invention provides an improved adjusting mechanism. Unlike prior art arrangements, the adjusting mechanism of the present invention permits the spring force to be varied without increasing the axial size of the brake device.

Spring 44 will generally supply most of the spring force imposed on armature plate 40, with a lesser portion of the overall spring force being provided by smaller fixed springs, such as spring 42. The adjusting mechanism includes a pushing element 48 having outer threads engaging inner threads defined about the inside of an adjusting nut 50. As a result, rotation of adjusting nut 50 will cause axial movement of pushing element 48. Depending on the direction of such axial movement, spring 44 will either be released or compressed. By varying the compression of spring 44 in this manner, the braking torque can be controlled with relative precision.

As shown, pushing element 48 may be equipped with one or more radial tabs 52. Each radial tab is received in a respective keyway slot 56 extending axially along the inner surface of the housing's receiving bore. As a result, pushing element 48 will be prevented from undesirably rotating as it moves axially.

The inner surface of the housing bore defines a first annular groove 60 which is aligned during use with a second annular groove 62 defined about the outer surface of adjusting nut 50. A ring 64, located inside of the aligned grooves, interconnects adjusting nut 50 with housing structure 20. As shown in FIG. 5, this construction allows nut 50 to rotate freely with respect to housing structure 20. Advantageously, rotation of nut 50 will cause axial movement of pushing element 48 without changing the overall axial dimension of brake apparatus 12.

To facilitate installation of the adjusting mechanism into housing structure 20, ring 64 may be a compressible snap ring. In this case, housing structure 20 may include a tapered lead-in surface 66 at the mouth of the housing's receiving bore. Surface 66 radially compresses the snap ring into groove 62 as adjusting nut 50 is moved axially into the receiving bore. Because groove 62 has sufficient depth to receive ring 64 substantially entirely therein, adjusting nut 50 can be moved into the receiving bore until the ring grooves are aligned. The axial region between groove 60 and lead-in surface 66 can thus be characterized as a ring compression portion. Once the ring grooves are aligned, ring 64 will radially expand to interconnect housing structure 20 and adjusting nut 50 for relative rotation.

Figure 7:
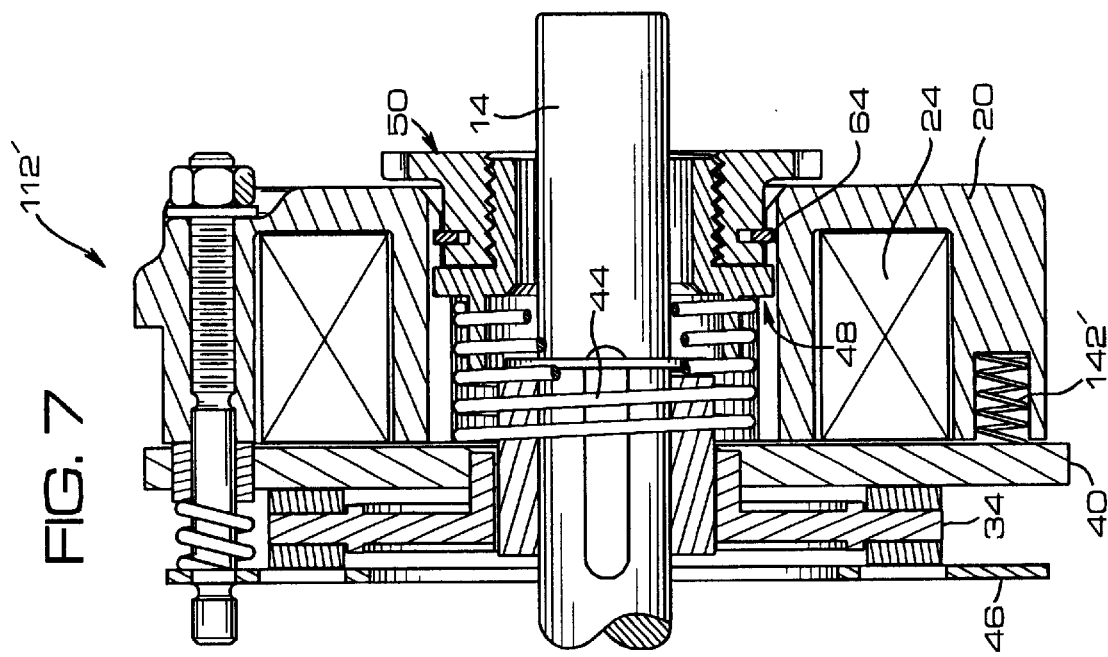
FIG. 7 illustrates the shaft braking apparatus of FIG. 6 after being retrofit with a torque adjustment mechanism.
Figure 6:
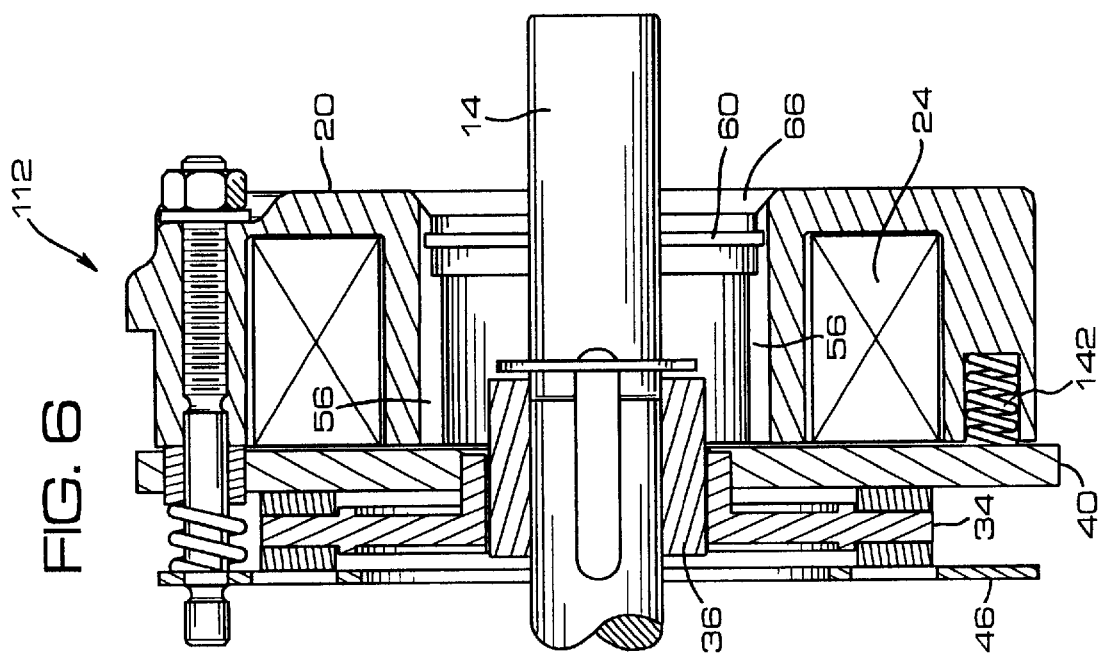
FIG. 6 is a cross-sectional view of a shaft braking apparatus having a housing structure of the present invention without a torque adjustment mechanism.

According to the present invention, it is contemplated that housing structure 20 may be the same whether or not the brake apparatus will be provided with an adjustable torque feature. For example, as shown in FIG. 6, a brake apparatus 112 may be provided having only fixed springs, such as fixed spring 142. Due to the ease with which the adjusting mechanism can be installed, the unit can be quickly converted to have a torque adjustment feature. The modified brake apparatus 112' thus produced is illustrated in FIG. 7. It will often be desirable to replace the heavier fixed springs 142 with lighter fixed springs 142' when spring 44 is installed to increase the variable portion of the spring force.

Figure 10:
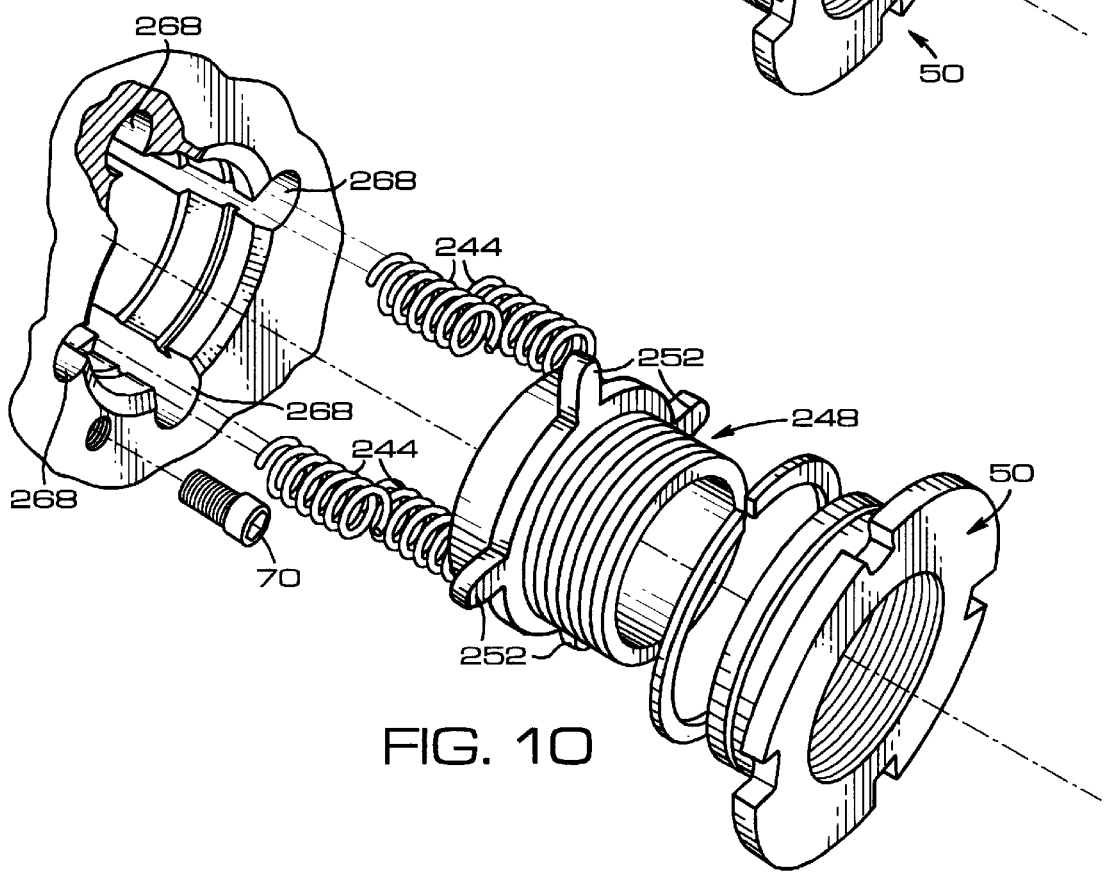
FIG. 10 is an enlarged perspective view showing components of the embodiment of FIG. 8.

FIG. 8 illustrates an alternative braking apparatus 212 utilizing a plurality of smaller springs 244, in lieu of spring 44. As shown, each of these smaller springs is located in a respective spring bore 268 (FIG. 10). In addition to preventing rotation of pushing element 248, radial tabs 252 serve to engage the respective springs 244 during torque adjustment.

Figure 9:
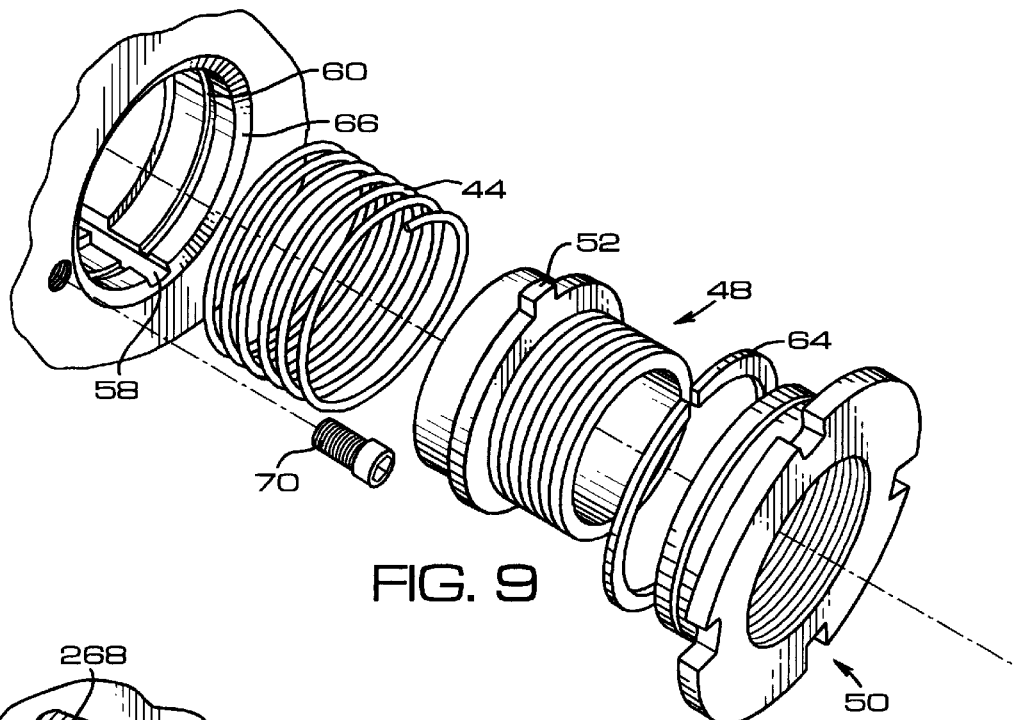
FIG. 9 is an enlarged perspective view showing components of the embodiment of FIG. 3.

Referring now to FIGS. 9 and 10, various components of the adjustment mechanism in both of the described embodiments can be easily seen. As can also be seen in these figures, both embodiments preferably include means to "lock in" the selected spring force level. For example, a set screw 70 may be threaded into a suitable bore provided in the housing structure. The head of set screw 70 will be located in one of the wrench engaging notches of the adjusting nut, thus preventing it from rotating and thereby changing the selected spring force.

It can thus be seen that the present invention provides a braking apparatus in furtherance of the noted objects. While preferred embodiments of the invention have been shown and described, modifications and variations thereto may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A braking apparatus for use with a rotatable shaft, said braking apparatus comprising:

a frictional disk connected to said shaft and rotatable therewith;

an armature plate axially movable into and out of engagement with said frictional disk;

an electromagnetic coil assembly operative to effect axial movement of said armature plate in a first axial direction;

at least one spring element applying an axial spring force to said armature plate in a second axial direction opposite to said first axial direction; and an adjusting mechanism engaging said at least one spring element to permit adjustment of said spring force upon rotation of a rotatable adjusting element, said rotatable adjusting element being substantially axially stationary during rotation thereof with respect to a housing structure of said braking apparatus, said adjusting mechanism including an annular ring interconnecting said adjusting element and said housing structure to permit relative rotation therebetween.

2. A braking apparatus as set forth in claim 1, wherein said annular ring is received in both a first annular ring groove defined in said housing structure and a second annular ring groove defined in said adjusting element.

3. A braking apparatus as set forth in claim 2, wherein said annular ring is a compressible snap ring.

4. A braking apparatus as set forth in claim 3, wherein said housing structure defines a tapered lead-in surface causing radial compression of said snap ring during installation of said adjusting element.

5. A braking apparatus as set forth in claim 1, wherein said adjusting mechanism comprises a pushing element having a first threaded portion engaging a second threaded portion of said adjusting element such that rotation of said adjusting element causes axial movement of said pushing element, said pushing element engaging said at least one spring element to vary a spring force thereof.

6. A braking apparatus as set forth in claim 5, wherein said pushing element comprises at least one radial tab received in an associated key slot defined in said housing structure.

7. A braking apparatus as set forth in claim 5, wherein said at least one spring element comprises a helical spring surrounding said shaft.

8. A braking apparatus as set forth in claim 5, wherein said at least one spring element comprises a plurality of spring elements angularly spaced apart at respective locations around said shaft.

9. A braking apparatus as set forth in claim 8, wherein said at least one radial tab comprises a plurality of radial tabs, each of said radial tabs engaging a respective one of said spring elements.

10. A variable spring force actuation mechanism, said mechanism comprising:

a housing structure defining a receiving bore therein;

a rotatable adjusting nut extending into said receiving bore and having inner threads thereon, said adjusting nut being substantially axially stationary during rotation thereof with respect to said housing structure;

a pushing element located in said receiving bore, said pushing element having outer threads engaging said inner threads of said adjusting nut such that rotation of said adjusting nut will cause axial movement of said pushing element; and at least one spring element engaged by said pushing element such that axial movement of said pushing element will cause a variation in the spring force thereof.

11. A variable spring force actuation mechanism said mechanism comprising:

a housing structure defining a receiving bore therein;

a rotatable adjusting nut extending into said receiving bore and having inner threads thereon, said adjusting nut being substantially axially stationary during rotation thereof with respect to said housing structure;

a pushing element located in said receiving bore, said pushing element having outer threads engaging said inner threads of said adjusting nut such that rotation of said adjusting nut will cause axial movement of said pushing element, said adjusting nut and said housing structure being innerconnected by an annular ring; and at least one spring element engaged by said pushing element such that axial movement of said pushing element will cause a variation in the spring force thereof.

12. A spring force actuation mechanism as set forth in claim 11, wherein said annular ring is received in both a first annular groove defined in said adjusting nut and a second annular groove defined in said housing structure.

13. A spring force actuation mechanism as set forth in claim 12, wherein said annular ring is a compressible snap ring.

14. A spring force actuation mechanism as set forth in claim 13, wherein said first annular groove has sufficient depth to substantially receive said compressible snap ring therein during alignment of said first axial groove and said second axial groove.

15. A spring force actuation mechanism as set forth in claim 13, wherein said housing structure defines a tapered lead-in surface causing radial compression of said snap ring as said adjusting nut is inserted into said receiving bore.

16. A spring force actuation mechanism as set forth in claim 15, wherein said pushing element comprises at least one radial tab received in an associated key slot defined in said housing structure.

17. A spring force actuation mechanism as set forth in claim 16, wherein said at least one radial tab comprises a plurality of spaced apart radial tabs.

18. A housing structure for a motor brake apparatus, said housing structure defining:

an axial receiving bore;

a cylindrical cavity located coaxial with said axial receiving bore for receipt of an actuation coil;

a tapered lead-in surface integrally extending into said axial receiving bore to facilitate radial compression of a compressable snap ring during installation thereof;

an annular snap ring groove extending about an inner surface of said receiving bore and axially spaced from said tapered lead-in surface by a snap ring compression portion; and at least one key slot extending axially along said inner surface of said receiving bore so as to intersect said annular snap ring groove.

19. A method of installing a torque adjustment nut into an axial receiving bore of a motor brake housing, said method comprising steps of:

(a) providing said adjustment nut having an extension portion defining a first annular snap ring groove on an outer surface thereof and inner threads on an inner surface thereof;

(b) providing a spring pushing element having outer threads thereon for engaging said inner threads of said adjustment nut;

(c) providing said motor brake housing defining a tapered lead-in surface extending into said axial receiving bore, said motor brake housing further defining a second annular snap ring groove extending about an inner surface of said receiving bore at a location axially spaced from said tapered lead-in surface by a snap ring compression portion;

(d) inserting a compressible snap ring into said first annular snap ring groove of said adjustment nut;

(e) moving said adjustment nut into said receiving bore such that said tapered lead-in surface will cause said snap ring to be compressed in said first annular snap ring groove; and (f) continuing to move said adjustment nut into said receiving bore until said first annular snap ring groove and said second annular snap ring groove are aligned, whereby said snap ring will expand to interconnect said adjustment nut and said motor brake housing while permitting relative rotation therebetween.

20. A method as set forth in claim 19, wherein said pushing element and said adjustment nut are at least loosely connected as a unit during installation of said adjustment nut.

21. A method as set forth in claim 20, further comprising the step of installing at least one spring element prior to step (e).

* * * * *